United States Patent
Hilmola

(10) Patent No.: US 10,607,278 B2
(45) Date of Patent: Mar. 31, 2020

(54) SYSTEM AND METHOD FOR POPULATING A DATABASE WITH A SET OF INFORMATION RELATED TO AN ITEM OWNED BY A FIRST OWNER THAT IS TRANSFERRED TO A SECOND OWNER

(71) Applicant: Appsoft Oy, Vantaa (FI)

(72) Inventor: Jukka Hilmola, Helsinki (FI)

(73) Assignee: APPSOFT OY, Vantaa (FI)

( * ) Notice: Subject to any disclaimer, the term of this patent is extended or adjusted under 35 U.S.C. 154(b) by 392 days.

(21) Appl. No.: 15/273,024

(22) Filed: Sep. 22, 2016

(65) Prior Publication Data
US 2018/0082359 A1 Mar. 22, 2018

(51) Int. Cl.
*G06Q 30/00* (2012.01)
*G06Q 30/06* (2012.01)
*G06F 16/58* (2019.01)
*G06F 16/23* (2019.01)
*G06F 16/901* (2019.01)
*G06Q 50/00* (2012.01)

(52) U.S. Cl.
CPC ..... *G06Q 30/0643* (2013.01); *G06F 16/2379* (2019.01); *G06F 16/58* (2019.01); *G06F 16/9024* (2019.01); *G06Q 50/01* (2013.01)

(58) Field of Classification Search
CPC .............. G06Q 30/00; G06Q 30/0601; G06Q 30/0641; G06Q 30/0643
See application file for complete search history.

(56) References Cited

U.S. PATENT DOCUMENTS

| | | | | |
|---|---|---|---|---|
| 5,319,542 A | * | 6/1994 | King, Jr. | G06Q 10/087 705/26.61 |
| 7,433,832 B1 | * | 10/2008 | Bezos | G06Q 10/10 705/26.8 |
| 7,614,547 B2 | | 11/2009 | Kotas et al. | |

(Continued)

FOREIGN PATENT DOCUMENTS

| WO | 01/84268 A2 | 11/2001 |
|---|---|---|
| WO | 03/038560 A2 | 5/2003 |

OTHER PUBLICATIONS

Gavish, Bezalel, and Christopher L. Tucci. "Reducing internet auction fraud." Communications of the ACM 51.Article (2008): 89-97. (Year: 2008).*

*Primary Examiner* — Christopher B Seibert
(74) *Attorney, Agent, or Firm* — Ziegler IP Law Group, LLC

(57) ABSTRACT

Populating a database with information includes associating a first interactive item card with the first item; associating the card with the first owner; associating information content with the card. The information content includes a first location, or first image of the first item, social media interaction related to the card at a first moment of time or information related to the first owner; changing association of the card from the first owner to a second owner if the ownership of the first item is transferred; adding to the information content additional information content that includes a second location or a second image of the first item, at least one social media interaction related to the card at a second moment of time or an information related to the second owner; and populating the database with the associations and the information content.

10 Claims, 16 Drawing Sheets

(56) References Cited

U.S. PATENT DOCUMENTS

| | | | |
|---|---|---|---|
| 7,778,890 B1* | 8/2010 | Bezos | G06Q 10/10 705/26.1 |
| 8,370,203 B2* | 2/2013 | Dicker | G06Q 30/02 705/14.53 |
| 8,650,090 B2 | 2/2014 | Altschuler | |
| 2001/0037258 A1* | 11/2001 | Barritz | G06Q 30/06 705/27.1 |
| 2001/0037261 A1* | 11/2001 | Ishitsuka | G06Q 30/06 705/26.81 |
| 2001/0049606 A1 | 12/2001 | Lucarelli | |
| 2003/0177072 A1* | 9/2003 | Bared | G06Q 30/06 705/26.81 |
| 2003/0233425 A1* | 12/2003 | Lyons | G06Q 30/02 709/217 |
| 2004/0133542 A1* | 7/2004 | Doerksen | G06F 17/243 |
| 2005/0216304 A1* | 9/2005 | Westphal | G06Q 30/00 705/26.1 |
| 2005/0289039 A1* | 12/2005 | Greak | G06Q 30/0609 705/37 |
| 2007/0276721 A1* | 11/2007 | Jackson | G06Q 30/02 705/14.51 |
| 2007/0282693 A1* | 12/2007 | Staib | G06Q 30/02 705/26.5 |
| 2008/0071640 A1* | 3/2008 | Nguyen | G06Q 20/387 705/14.27 |
| 2009/0292584 A1* | 11/2009 | Dalal | G06Q 30/02 705/7.29 |
| 2010/0083217 A1* | 4/2010 | Dalal | G06F 3/0482 717/106 |
| 2010/0191582 A1* | 7/2010 | Dicker | G06Q 30/02 705/14.51 |
| 2011/0040649 A1* | 2/2011 | Dooley | G06Q 20/382 705/26.5 |
| 2011/0040655 A1* | 2/2011 | Hendrickson | G06Q 30/02 705/27.1 |
| 2011/0125569 A1* | 5/2011 | Yoshimura | G06Q 10/10 705/14.36 |
| 2011/0238588 A1 | 9/2011 | Engestrom et al. | |
| 2012/0166964 A1* | 6/2012 | Tseng | G06F 3/048 715/745 |
| 2012/0290448 A1* | 11/2012 | England | G06Q 30/0282 705/27.2 |
| 2013/0006788 A1* | 1/2013 | Zhou | G06Q 30/02 705/26.1 |
| 2013/0041781 A1* | 2/2013 | Freydberg | G06Q 30/06 705/27.1 |
| 2013/0211968 A1* | 8/2013 | Patro | G06Q 30/06 705/27.1 |
| 2013/0262193 A1* | 10/2013 | Sundaresan | G06Q 10/10 705/12 |
| 2013/0268377 A1* | 10/2013 | Jessup | G06Q 30/0605 705/14.73 |
| 2013/0311315 A1* | 11/2013 | Zises | G06Q 30/0605 705/26.2 |
| 2014/0100991 A1* | 4/2014 | Lenahan | G06Q 30/0625 705/26.62 |
| 2014/0108196 A1 | 4/2014 | Yankovich et al. | |
| 2014/0143090 A1* | 5/2014 | Deyle | G06Q 10/0833 705/26.35 |
| 2014/0164185 A1* | 6/2014 | Jung | G06Q 10/083 705/26.61 |

\* cited by examiner

SYSTEM AND METHOD FOR POPULATING A DATABASE WITH A SET OF INFORMATION RELATED TO AN ITEM OWNED BY A FIRST OWNER THAT IS TRANSFERRED TO A SECOND OWNER

TECHNICAL FIELD

The present disclosure relates generally to database management of items in Consumer to Consumer (C2C) e-commerce platforms, and more specifically, to a system and a method for populating a database with a set of information related to an item owned by a first owner that is transferred to a second owner.

BACKGROUND

Consumer to Consumer (C2C) e-commerce platforms facilitate electronic transactions between consumers through a third party. A common example is an online auction, in which a consumer posts an item for sale and other consumers bid to purchase it. The third party generally charges a flat fee or a commission. When a user wants to sell an item, he typically makes a sales announcement that includes information on the item, such as its name, a description, price etc. The sales announcement may garner popularity and enable the user to sell the item to another user. However, the sales announcement is static and it typically ceases to exist once the item is sold. When the buyer of the item subsequently tries to resell the item, the process of making a sales announcement has to be repeated and the popularity or credibility gained by the previous sales announcement cannot be leveraged for subsequent transactions involving the same item.

Therefore, in light of the foregoing discussion, there exists a need to overcome the aforementioned drawbacks in database management in existing Consumer to Consumer (C2C) e-commerce platforms due to the lack of continuity and unavailability of information on the item after it is sold, which makes difficult for the buyer to resell the item.

SUMMARY

The present disclosure provides a method of populating a database with a set of information related to a first item owned by a first owner, the method comprising steps of;
  associating a first interactive item card with the first item;
  associating the first interactive item card with the first owner;
  associating the set of information content with the first interactive item card, wherein the set of information content includes at least one of:
    a first location of the first item, a first image of the first item, at least one social media interaction related to the first interactive item card at a first moment of time and an information related to the first owner;
  changing association of the first associated interactive item card from the first owner to a second owner if the ownership of the first item is transferred to the second owner from the first owner;
  adding to the set of information content an additional set of information content, wherein the additional set of information content includes at least one of:
    a second location of the first item,
    a second image of the first item,
    at least one social media interaction related to the first interactive item card at a second moment of time and an information related to the second owner; and
  populating the database with the associations and the set of information content.

The present disclosure also provides a system for implementing a method as described in this description, wherein the system comprises
  a database for maintaining and updating a set of information content;
  at least one imaging device for capturing at least one image of a first item;
  at least one module for analyzing differences between at least two images;
  at least one social media service; and
  at least one device for rendering the set of information content related to a first interactive item card and for users to interact with the first interactive item card via the at least one social media service.

Embodiments of the present disclosure substantially eliminate or at least partially address the aforementioned problems in the prior art, and enable maintaining continuity when items are sold in C2C platforms by tracking the history of ownership and other additional information such as social media interactions and transferring the full information from a current owner to a subsequent owner in the form of an interactive item card.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
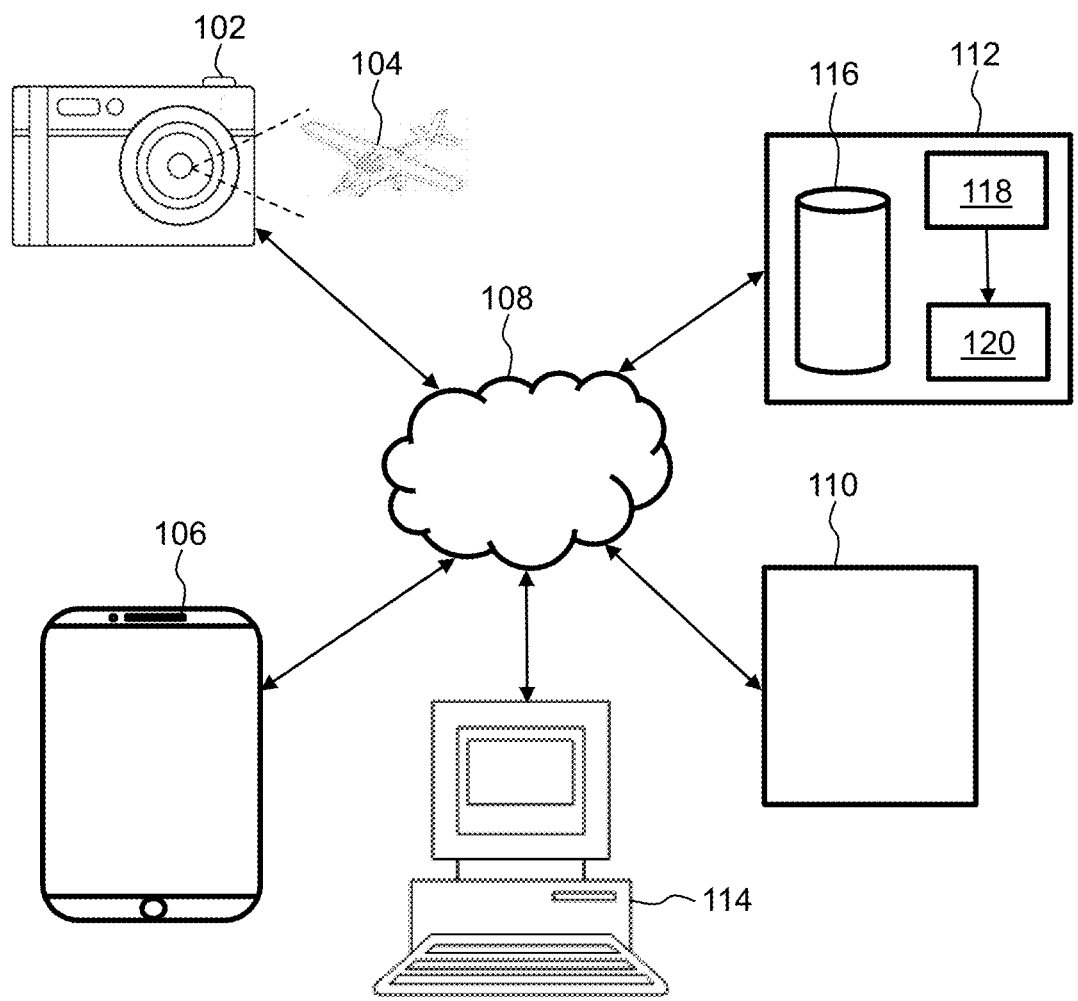
FIG. 1 is a schematic illustration of a system in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides a method of populating a database with a set of information related to a first item owned by a first owner, the method comprising steps of;

associating a first interactive item card with the first item;

associating the first interactive item card with the first owner;

associating the set of information content with the first interactive item card, wherein the set of information content includes at least one of:

a first location of the first item, a first image of the first item, at least one social media interaction related to the first interactive item card at a first moment of time and an information related to the first owner;

changing association of the first associated interactive item card from the first owner to a second owner if the ownership of the first item is transferred to the second owner from the first owner;

adding to the set of information content an additional set of information content, wherein the additional set of information content includes at least one of:

a second location of the first item, a second image of the first item, at least one social media interaction related to the first interactive item card at a second moment of time and an information related to the second owner; and populating the database with the associations and the set of information content.

The first interactive item card may be a data structure for storing information relating to the first item such as ownership information, one or more images of the first item, social network interactions and location information. The first interactive item card may be published online (e.g. on a C2C platform or a social media service). The method may enable the second owner and any subsequent owners to keep track of the set of information content related to the first item. The second owner can view the first image and the first location of the first item through the first interactive item card. The second owner may also view social media interactions related to the first interactive item card at any given time. The social media interactions may enable the second owner to take a decision on whether to buy the first item or not. The interactive item card provides details (e.g. price, description about the first item etc.) to the second owner to enable the second owner to make a decision on whether to purchase the first item. The method may automatically populate the database to associate the set of information content related to the first item with the first interactive item card.

The first item is associated with the first owner through the first interactive item card. The database comprises the first interactive item card. The first interactive item card may be associated with the first location of the first item, the first image of the first item and/or the at least one social media interaction related to the first interactive item card at the first moment in time. The first interactive item card may also be associated with information related to the first owner, the second location of the first item, the second image of the first item, the at least one social media interaction related to the first interactive item card at the second moment of time and/or the information related to the second owner. There may be one or several of such associations as listed above. The first interactive item card may comprise blogs about the first item. The blogs may be written by the first owner or the second owner, or by third party reviewers of the first item. The first interactive item card may comprise a serial number of the first item and an international mobile equipment identity number of the first item. The first location of the first item may comprise a location that is associated with the first owner, at which the first image is captured. The second location of the first item may comprise a location that is associated with the second owner, at which the second image is captured.

The information related to the first owner and the second owner of the first item may only be accessible to the current owner (e.g. the second owner or a third owner) of the first interactive item card, but not to members of the public. The ownership of the first interactive item card may be transferred from the first owner to the second owner along with the ownership of the first item. The second owner may continuously collect an additional set of information content related to the first item (e.g. the second image of the first item, reviews, blog posts, and social media interactions related to the first interactive item card at a second moment in time). In an embodiment, the additional set of information content is added to the first interactive item card. The second owner may sell the first item to a third owner, along with the first interactive item card and content collected by the first owner and the second owner (e.g. the set of information content and the additional set of information content), which are also transferred to the third owner.

According to an embodiment, the method further comprises capturing the first image of the first item with a first imaging device having a first location sensor for locating the first imaging device and using the location of the first imaging device at the time of capturing the first image as the first location of the first item. The first imaging device may be a camera, a phone, a tablet etc. that may be used to capture the first image of the first item. The first location sensor may comprise a Global Positioning System (GPS) to track the location of the first imaging device.

According to another embodiment, the method further comprises capturing the second image of the first item with a second imaging device having the second location sensor for locating the second imaging device and using the location of the second imaging device at the time of capturing the second image as the second location of the first item. The second imaging device may comprise a camera to capture the second image of the first item. The second location sensor may comprise a Global Positioning System (GPS) to track the location of the second imaging device. The images (e.g. the first image and/or the second image) and their corresponding locations (e.g. the first location and/or the second location) are stored in the first interactive item card as part of the information content, and may be used for verifying the first item and its transaction history.

According to yet another embodiment, the method further comprises verifying the association of the first interactive item card with the first item by analyzing differences between the first image with the second image and determining based on the differences if the first image and the second image have been taken from the first item or not. The verification step ensures that authenticity of the first item for any subsequent owner or person interested in the first item. According to yet another embodiment, the information content also comprises ownership history related to the first item and personal data related to the owners. The ownership history related to the first item may comprise time periods when the first item was owned by the first owner and the second owner (e.g. 1 year or more than one year) respectively. The personal data related to the owners may comprise information related to the first owner and the second owner, such as their names, addresses and current locations.

According to yet another embodiment, the method further comprises receiving the at least one social media interaction indication from a social media service, wherein the at least one social media interaction is done by a first user. The at least one social media interaction may comprise likes, shares, comments etc.

According to yet another embodiment, the method further includes recording an indication of an information content change in a block chain. The block chain may comprise blocks that hold timestamped batches of valid transactions and record the indication of the information content change. The information content related to the first interactive item card may be used for verifying the transaction, and change logs are stored in the block chain.

According to yet another embodiment, the method further includes determining a fingerprint of the information content and using the determined fingerprint as the indication of information content change. According to yet another embodiment, the fingerprint is determined by calculating a hash code of the information content. The fingerprint of the information content may be determined when the first owner or the second owner changed the information content in the first interactive item card associated with the first item. The fingerprint may be a virtual fingerprint that maps the information content to a shorter string of data using a fingerprinting algorithm to uniquely identify the information content.

The present disclosure also provides a system for implementing the method as described above, the system comprises:
 a database for maintaining and updating a set of information content;
 at least one imaging device for capturing at least one image of a first item;
 at least one module for analyzing differences between at least two images;
 at least one social media service; and
 at least one device for rendering the set of information content related to a first interactive item card and for users to interact with the first interactive item card via the at least one social media service.

The advantages of the present system are thus identical to those disclosed above in connection with the present method. The database may store the set of information content associated with the first interactive item card. The at least one imaging device may capture a first image and a second image of the first item. The at least one imaging device may comprise a first imaging device and a second imaging device. The at least one imaging device may be a camera, a phone, a tablet etc. The at least one device may be a tablet, a desktop, a smart phone, a personal computer, an electronic notebook, a mobile communication device, an augmented reality device or a virtual reality device. The at least one social media service may be Facebook®, Twitter®, Quikr®, OLX® etc. The at least one module may comprise an image capturing module, an interactive item card associating module, a social media interaction receiving module, an image analysis module, an item verification module, an ownership changing module, a database populating module and a fingerprint determining module.

The image capturing module may be configured to capture the first image of the first item using the first imaging device. The image capturing module may be configured to capture the second image of the first item using the second imaging device. The interactive item card associating module may be configured to associate the first interactive item card with the first item. The interactive item card associating module may be further configured to associate the first interactive item card with the first owner. The interactive item card associating module may further be configured to associate the set of information content with the first interactive item card.

The social media interaction receiving module may be configured to receive at least one social media interaction related to the first interactive item card at a first moment of time and a second moment of time from a social media service. The at least one social media interaction may comprise likes, shares, comments etc. The system may increase a demand of the first item when it receives a higher number of social media interactions from potential buyers.

The image analysis module may be configured to analyse difference between the first image of the first item and the second image of the first item. The item verification module may further be configured to verify the association of the first interactive item card with the first item based on the differences, and to determine whether the first image and the second image of the first item have been taken from the first item or not.

The ownership changing module may be configured to change association of the first associated interactive item card from the first owner to the second owner when the ownership of the first item is transferred to the second owner from the first owner. The interactive item card associating module may further be configured to add an additional set of information content to the set of information content when the ownership of the first item is transferred to the second owner from the first owner. The additional set of information content may comprise a second location of the first item, a second image of the first item, at least one social media interaction related to the first interactive item card at a second moment of time and/or an information related to the second owner. The database populating module may be configured to populate the database with the association of the set of information content.

The fingerprint determining module may be configured to determine a fingerprint of the information content (e.g. the set of information content or the additional set of information content) by calculating a hash code of the information content. In an embodiment, the determined fingerprint may be used as the indication of information content change.

The system may comprise a server. In an embodiment, the server may be a tablet, a desktop, a smart phone, a personal computer, an electronic notebook, a mobile communication device, an augmented reality device or a virtual reality device. In another embodiment, the server may be a cloud service. The server may at least partially comprise the above modules to populate the database with the set of information related to the first item owned by the first owner that is transferred to the second owner. In an embodiment, the server may comprise all the above modules to populate the database with the set of information related to the first item owned by the first owner that is transferred to the second owner. The system may comprise more than one server that may comprise one or more of the above modules. In an embodiment, the server may comprise a Customer to Customer (C2C) platform.

In an example embodiment, when a first owner decides to sell his/her vintage motor cycle (e.g. a first item), the first owner may add the vintage motor cycle to a Customer to Customer (C2C) platform (e.g. a server or a cloud service) using an "add item wizard" button to create a first interactive item card. Once, the first interactive item card is created at the Customer to Customer platform, one or more users (e.g. a person who is interested in the vintage motor cycle) may like or share the vintage motor cycle through a social media service. The one or more users may add a comment (e.g. I love it! Looks so cool! Definitely going to like this item) about the vintage motor cycle through the social media service. A second owner may be interested in the vintage motor cycle and decided to buy the vintage motor cycle. The second owner may send a request to buy the vintage motor cycle with a price demanded by the first owner using a "request to buy button" of the Customer to Customer platform. The first owner may accept the request received from the second owner at the C2C platform to sell the vintage motor cycle to the second owner. The C2C platform may create a transaction between the first owner and the second owner when the first owner accepts the request of second owner. The C2C platform may comprise a payment service provider that collects the payment towards the transaction from the second owner. The first interactive item card disappears from the public appearance at the C2C platform once the payment is collected from the second owner. The C2C platform marks the transaction as completed when the first owner delivers the vintage motor cycle to the second owner. When the second owner accepts the receipt of the vintage motor cycle from the first owner at C2C platform, the payment towards the transaction is transferred to the first owner. Simultaneously, the ownership of the first interactive item card associated with the vintage motor cycle is transferred to the second owner. The second owner acquires the ownership of the vintage motor cycle and the first interactive item card.

In an embodiment, the first owner and one or more users of the C2C platform may interact with the first interactive item card associated with the vintage motor cycle. The interactions details of the first owner and the one or more users of the C2C platform with the first interactive item card may be stored in a database of the C2C platform.

Embodiments of the present disclosure may enable maintaining continuity when the first item is sold in C2C platforms by tracking the history of ownership and other additional information such as social media interactions. Further, the embodiments may enable transferring the set of information related to the first item from the first owner to the second owner or subsequent owner in the form of the first interactive item card. The embodiments may enable populating the database with set of information content and the additional set of information content that associated with the first item.

DETAILED DESCRIPTION OF THE DRAWINGS

FIG. 1 is a schematic illustration of a system in accordance with an embodiment of the present disclosure. The system comprises at least one imaging device, a first item 104, a network 108, at least one social media service 110, a server 112 and at least one device 114. The at least one imaging device may capture at least one image of the first item 104. The at least one imaging device comprises a first imaging device 102 and a second imaging device 106. The first imaging device 102 may be associated with a first owner. The first imaging device 102 captures a first image of the first item 104. The second imaging device 106 may be associated with a second owner. The second imaging device 106 captures a second image of the first item 104. The server 112 comprises a database 116 and at least one module. The server may be a cloud service. The database 116 maintains and updates a set of information content related to a first interactive item card of the first item 104. The at least one module may comprise an image analysis module 118 and an item verification module 120. The image analysis module 118 analyses difference between the first image of the first item 104 and the second image of the first item 104. The item verification module 120 verifies the association of the first interactive item card with the first item 104 based on the differences, and determine whether the first image and the second image of the first item 104 have been taken from the first item 104 or not. The first owner and the second owner may communicate with the first interactive item card through the network 108. The at least one device 114 renders the set of information content related to the first interactive item card and for one or more users of the server 112 (e.g. a Customer to Customer (C2C) platform) to interact with the first interactive item card through the at least one social media service 110.

Figure 2:
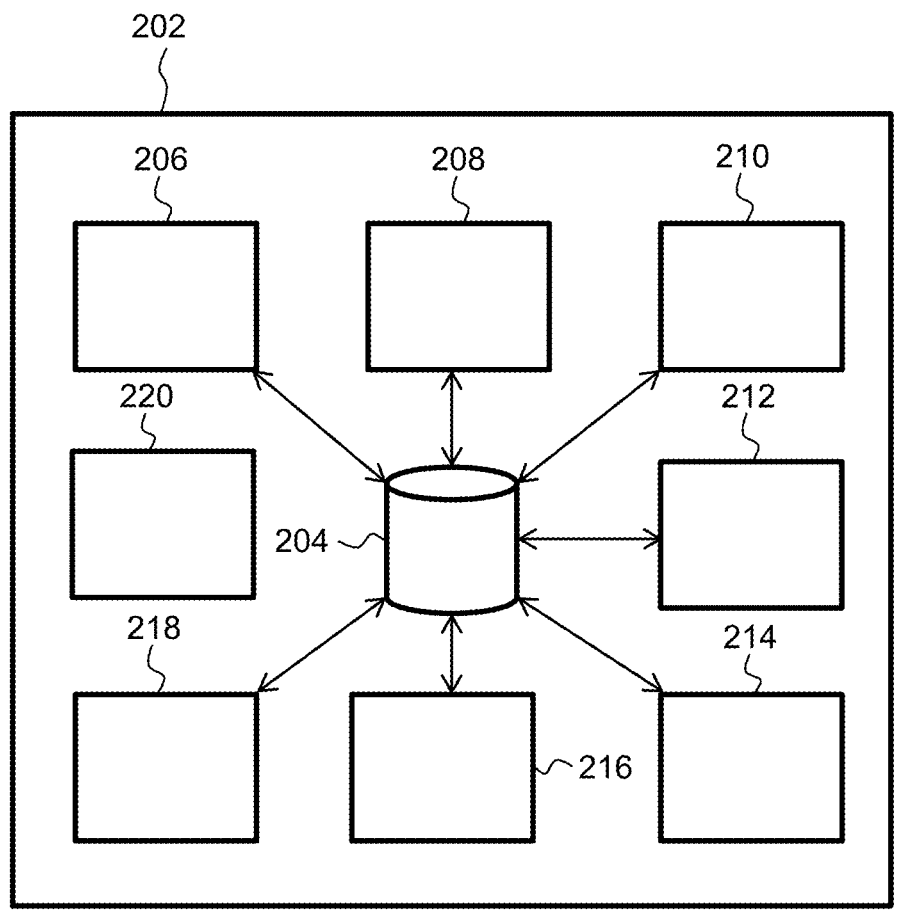
FIG. 2 is a functional block diagram of a server in accordance with an embodiment of the present disclosure.

FIG. 2 is a functional block diagram of a server 202 in accordance with an embodiment of the present disclosure. The server 202 comprises a database 204 and at least one module. The at least one module comprises an image capturing module 206, an interactive item card associating module 208, a social media interaction receiving module 210, an image analysis module 212, an item verification module 214, an ownership changing module 216, a database populating module 218 and a fingerprint determining module 220. These modules function as has been described above.

Figure 3:
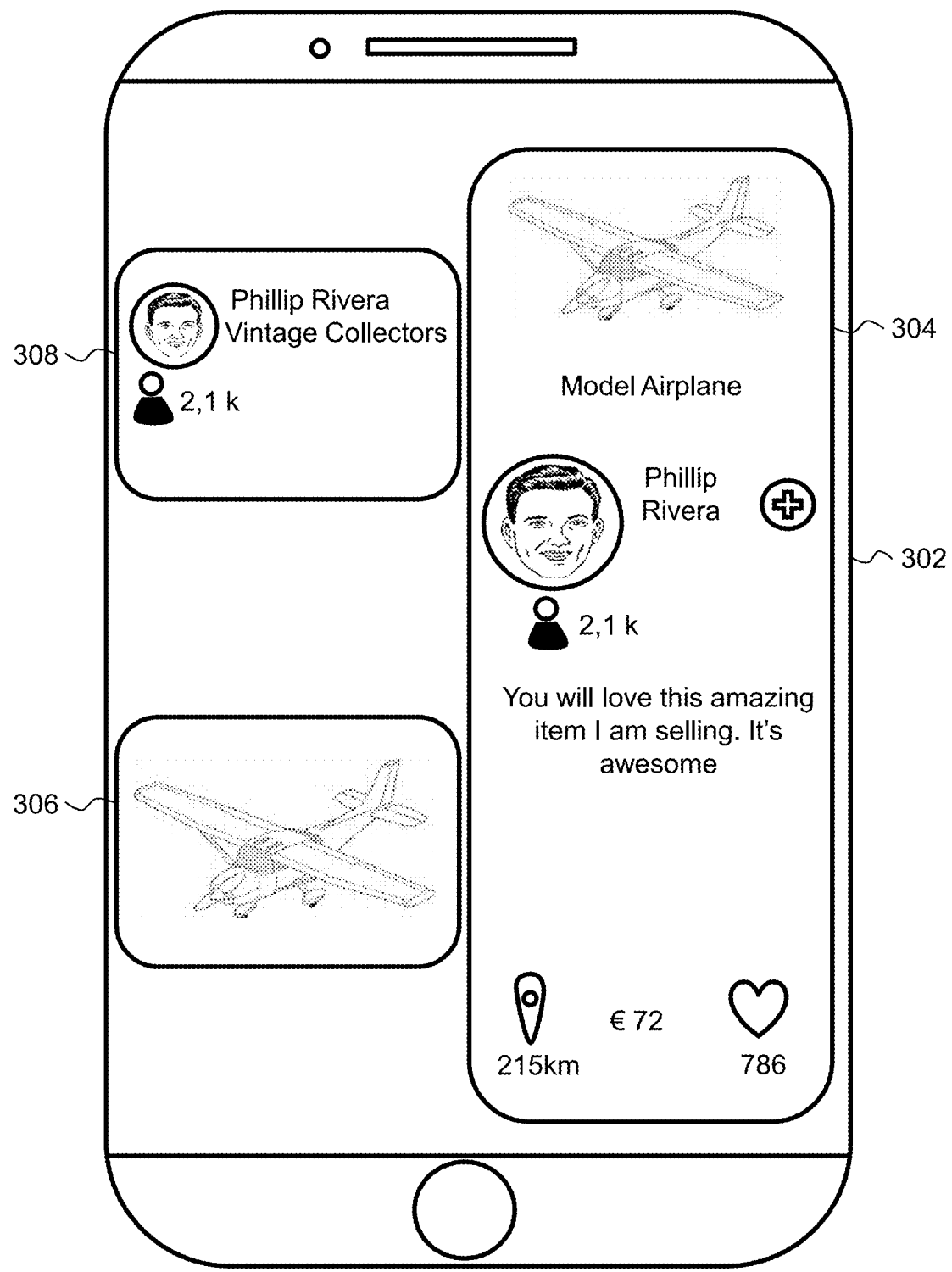
FIG. 3 is an exemplary user interface view of a device that illustrates adding a first interactive item card related to a first item to a server, in accordance with an embodiment of the present disclosure.

FIG. 3 is an exemplary user interface view of a device 302 that illustrates adding a first interactive item card 304 related to a first item 306 to a server, in accordance with an embodiment of the present disclosure. The user interface view of the device 302 provides options to a first owner 308 associated with the first item 306 to create and add the first interactive item card 304 for the first item 306 to the server (e.g. a Customer to Customer (C2C) platform). The first interactive item card 304 may comprise a set of information content associated with the first item 306 (e.g. a first image of the first item 306, a first location of the first item 306, description of the first item 306, price of the first item 306 etc.). The user interface view of the device 302 further displays information related to the first owner 308. The information related to the first owner 308 may comprise name, address, current location of the first owner 308 and number of followers who follows the first owner 308 on a social media service.

Figure 4:
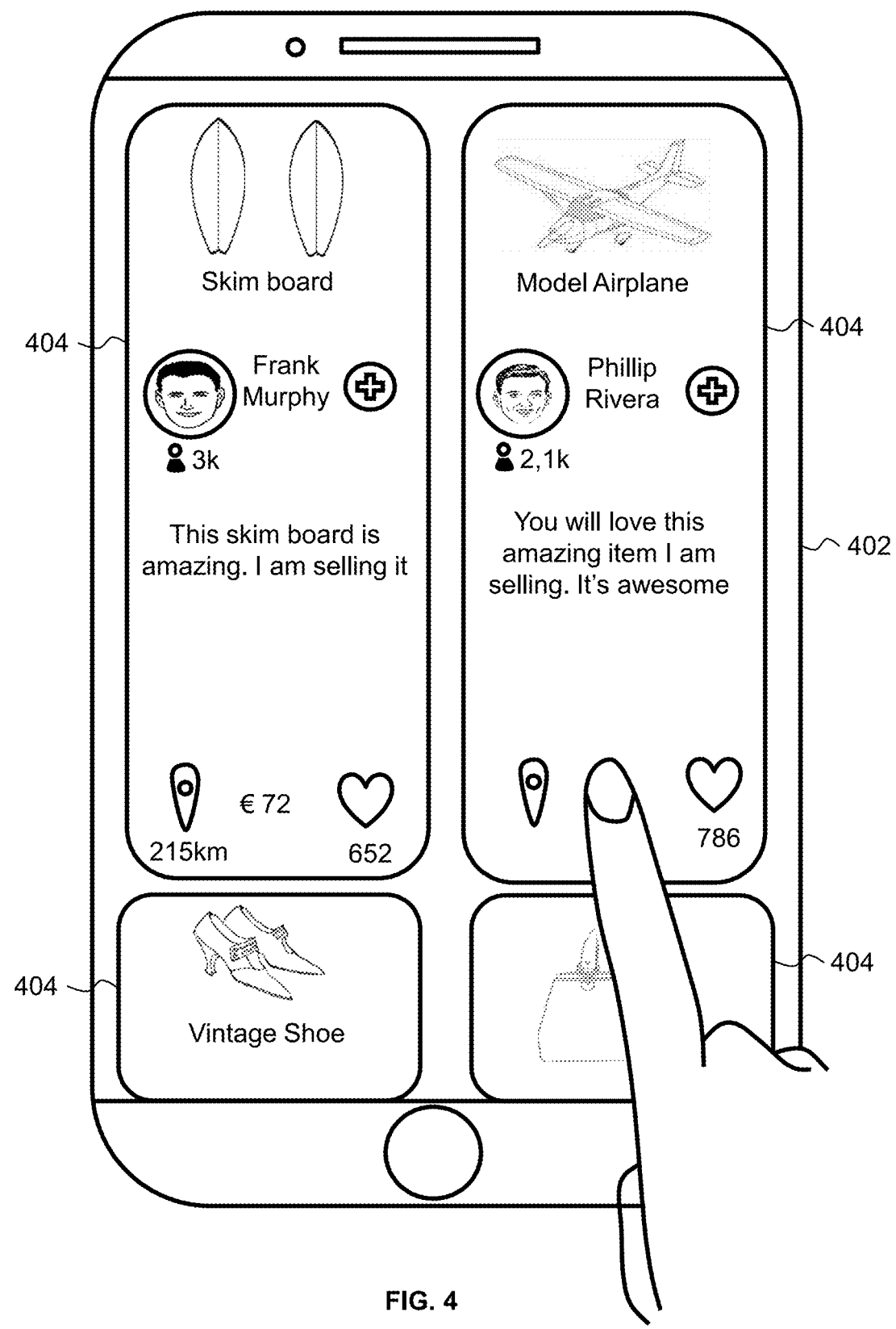
FIG. 4 is an exemplary user interface view of a device that displays a plurality of interactive item cards to one or more users, in accordance with an embodiment of the present disclosure.

FIG. 4 is an exemplary user interface view of a device 402 that displays a plurality of interactive item cards 404 to one or more users, in accordance with an embodiment of the present disclosure. The user interface view of the device 402 displays the plurality of interactive item cards 404 that correspond to different items (e.g. a skim board, a model airplane, vintage show etc.) to one more users of a C2C platform.

Figure 5:
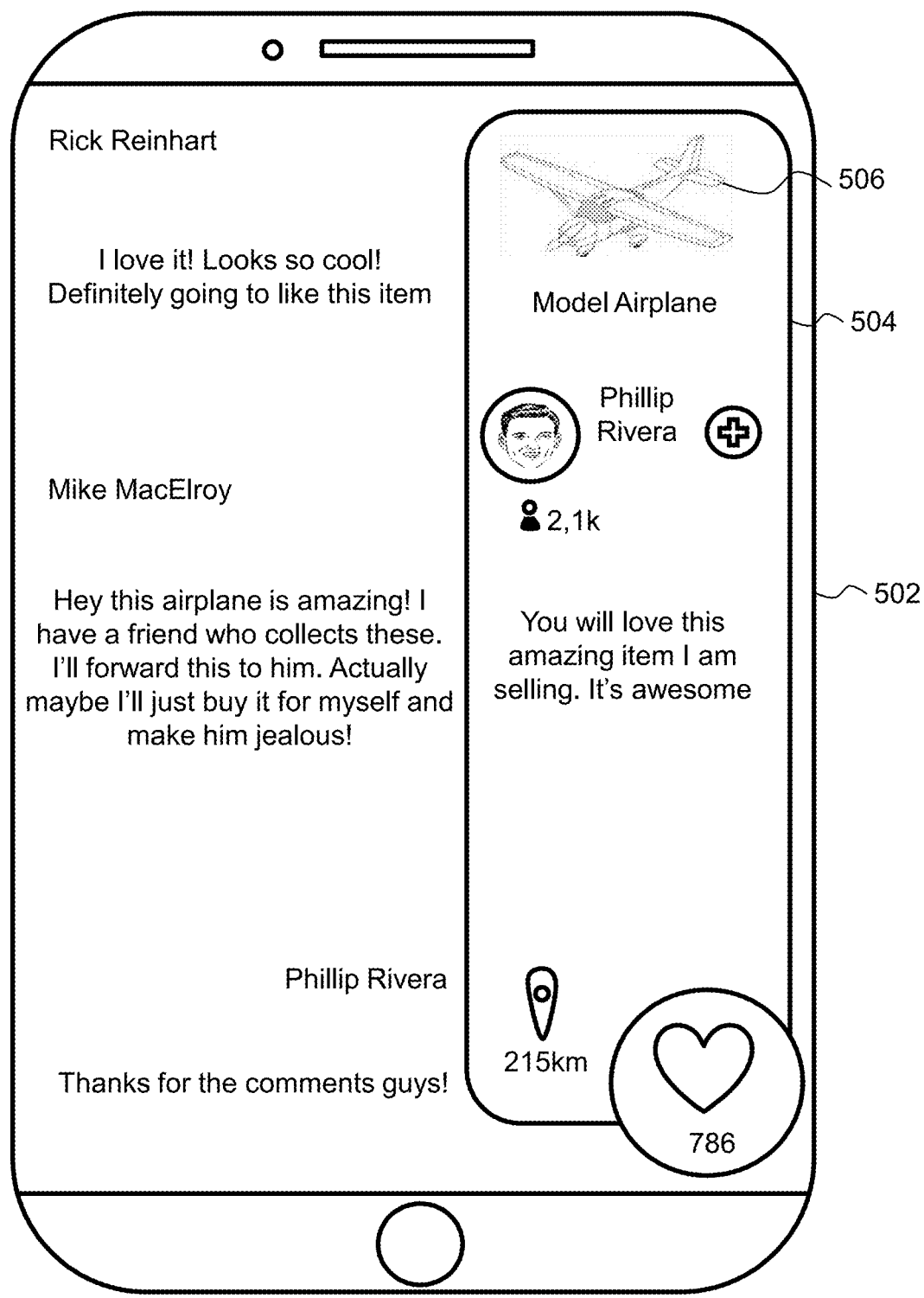
FIG. 5 is an exemplary user interface view of a device that displays social media interactions related to a first interactive item card associated with a first item, in accordance with an embodiment of the present disclosure.

FIG. 5 is an exemplary user interface view of a device 502 that displays social media interactions related to a first interactive item card 504 associated with a first item 506, in accordance with an embodiment of the present disclosure. The user interface view of the device 502 displays social media interactions related to the first interactive item card 504, such as likes and comments from one or more users of a C2C platform.

Figure 6:
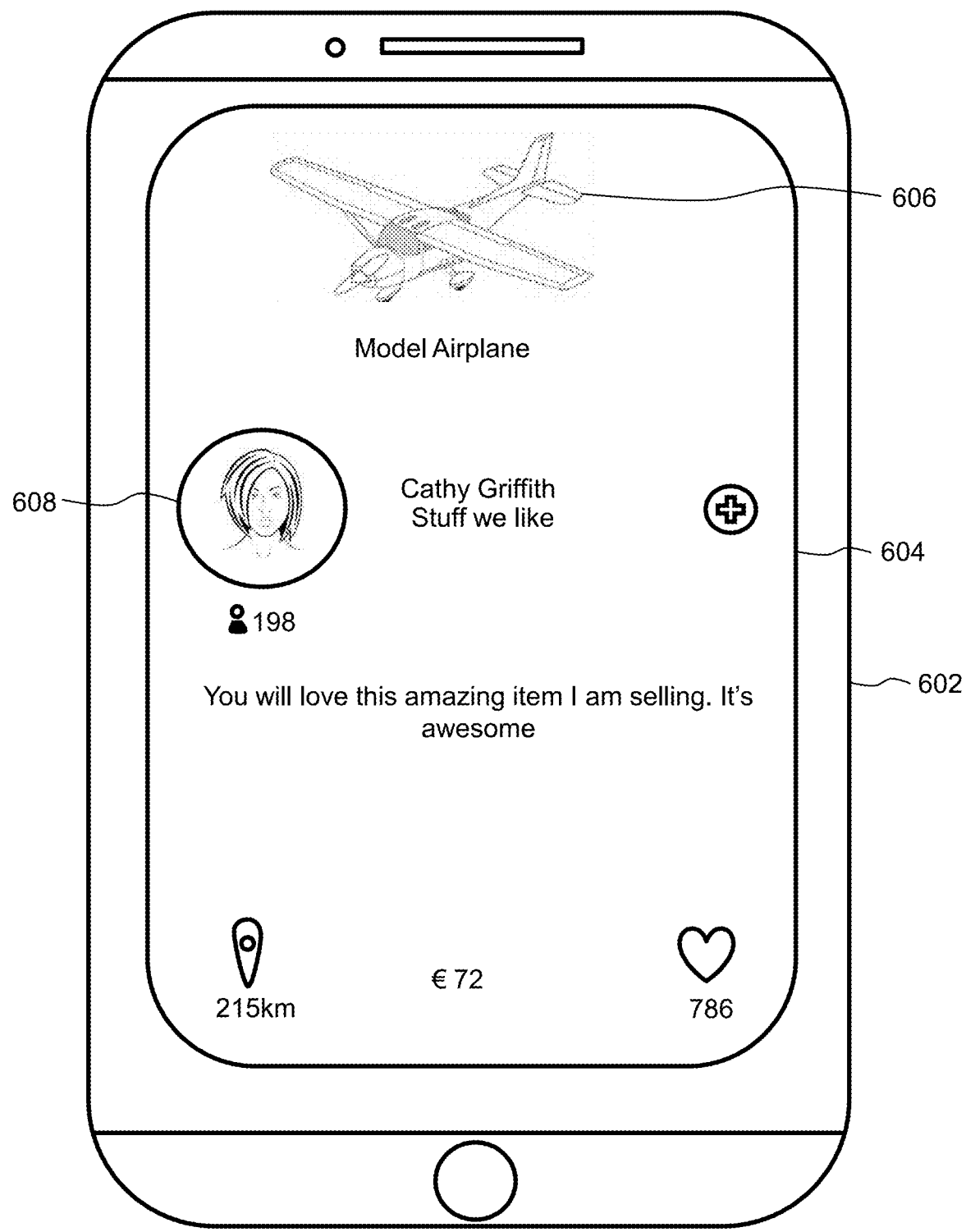
FIG. 6 is an exemplary user interface view of a device that illustrates a first item and a first interactive item card being transferred to a second owner, in accordance with an embodiment of the present disclosure.

FIG. 6 is an exemplary user interface view of a device 602 that illustrates a first item 606 and a first interactive item card 604 being transferred to a second owner 608, in accordance with an embodiment of the present disclosure. The first item 606 and the first interactive item card 604 is transferred to the second owner 608 when the first item 606 is sold to the second owner 608. The user interface view of the device 602 further displays information related to the second owner 608. The information related to the second owner 608 may comprise name, address, current location of the second owner 608 and number of followers who follows the second owner 608 on a social media service (e.g. 198 followers).

Figure 7:
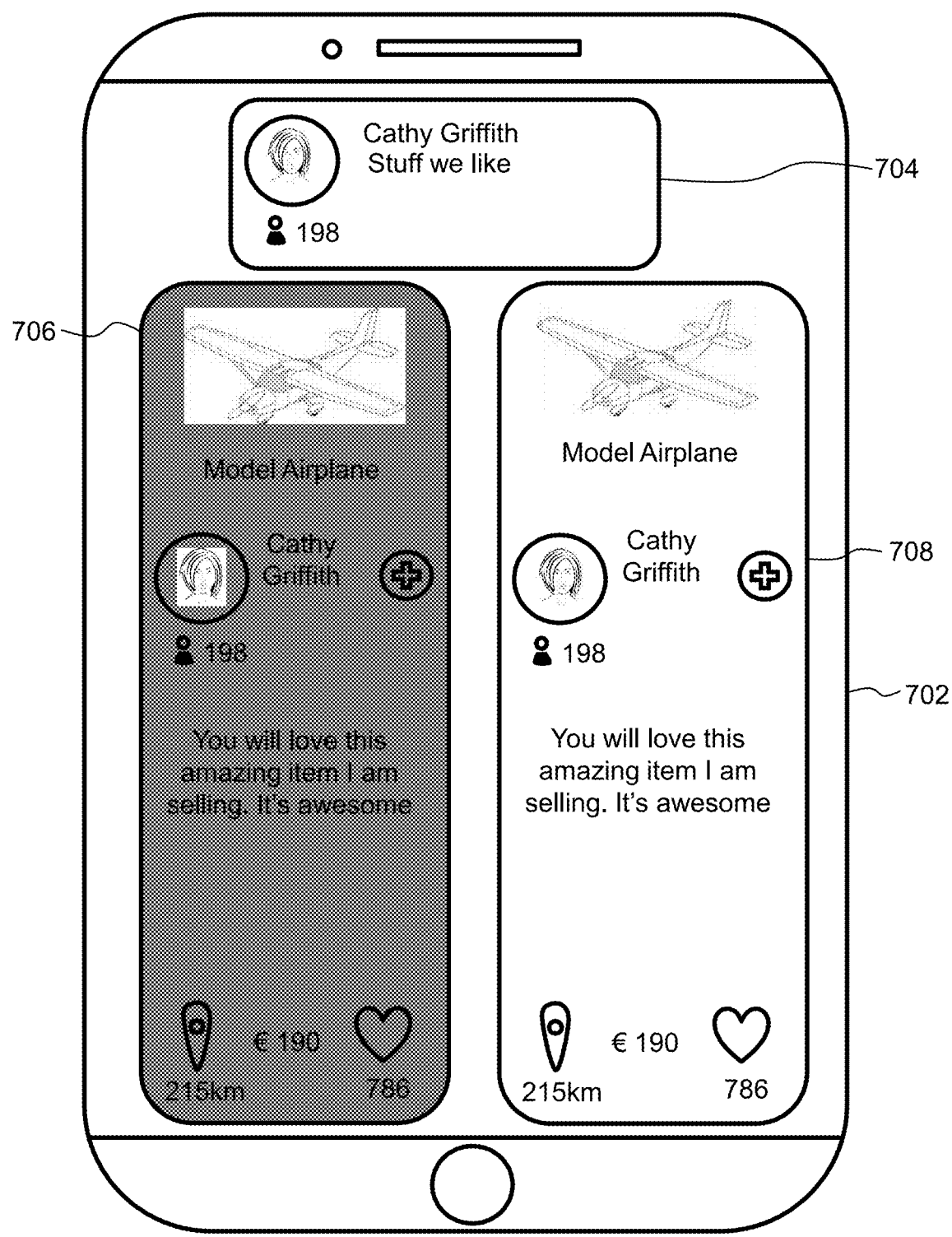
FIG. 7 is an exemplary user interface view of a device that illustrates changing a mode of the first interactive item card from an inactive mode to an active mode, in accordance with an embodiment of the present disclosure.

FIG. 7 is an exemplary user interface view of a device 702 that illustrates changing a mode of a first interactive item card from an inactive mode 706 to an active mode 708, in accordance with an embodiment of the present disclosure. The first interactive item card is controlled by a second owner 704 when the first interactive item card is transferred to the second owner 704 from the first owner. The second owner 704 may change the first interactive item card from the inactive mode 706 to the active mode 708 to be visible to one or more users of a C2C platform. The first interactive item card may not visible to the one or more users when the first interactive item card is in the inactive mode 706.

Figure 8:
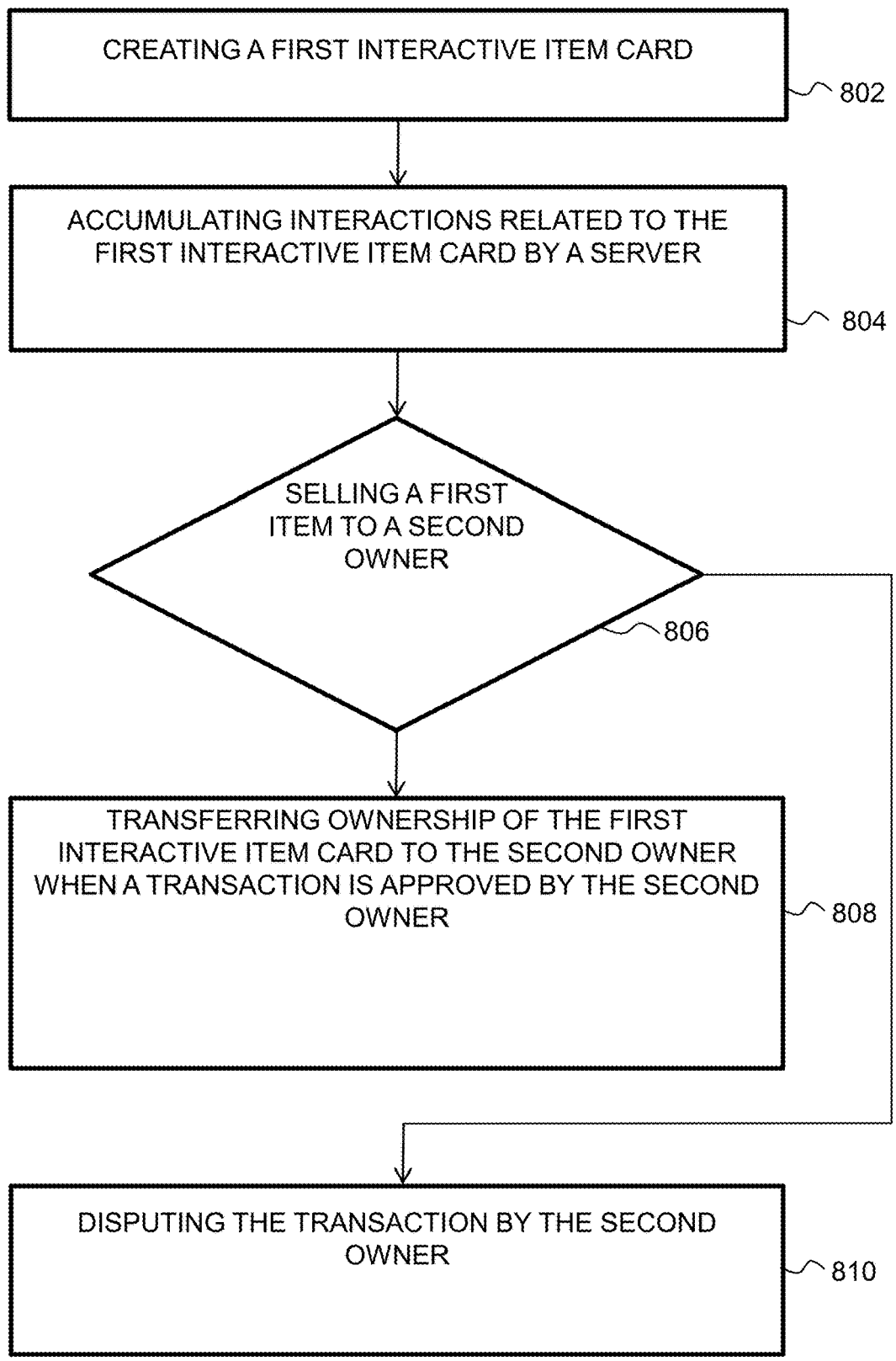
FIG. 8 is a flow diagram that illustrates a method of creating and transferring a first interactive item card from a first owner to a second owner in accordance with an embodiment of the present disclosure.

FIG. 8 is a flow diagram that illustrates a method of creating and transferring a first interactive item card from a first owner to a second owner in accordance with an embodiment of the present disclosure. At step 802, the first interactive item card is created by a first owner. At step 804, interactions related to the first interactive item card are accumulated by a server. At step 806, the first item is sold to a second owner. At step 808, an ownership of the first interactive item card is transferred to the second owner when a transaction is approved by the second owner. At step 810, the transaction is disputed by the second owner.

Figure 9A:
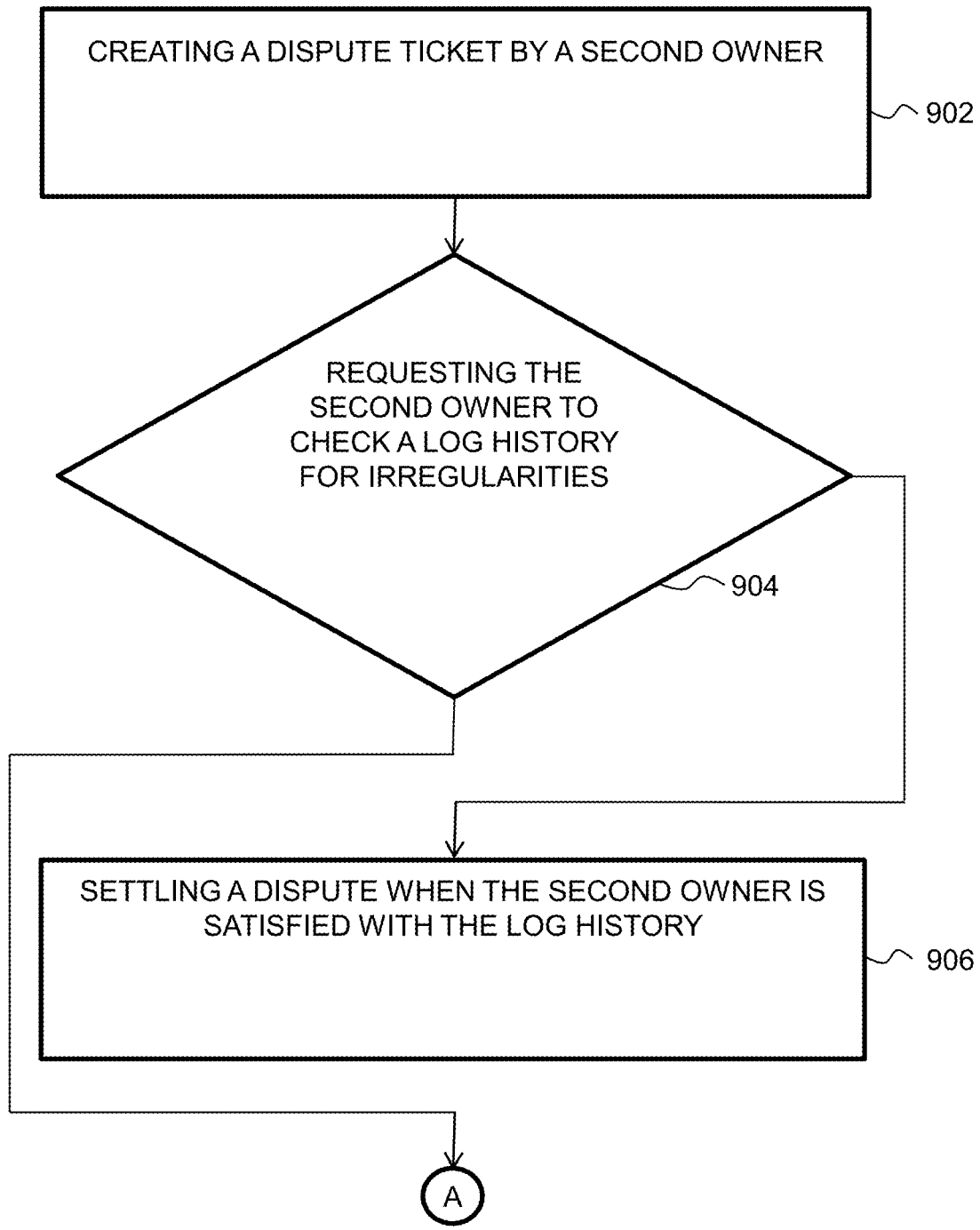
FIGS. 9A-9C are flow diagrams that illustrate a method of creating a dispute ticket to check a log history for log irregularities in accordance with an embodiment of the present disclosure.
Figure 9B:
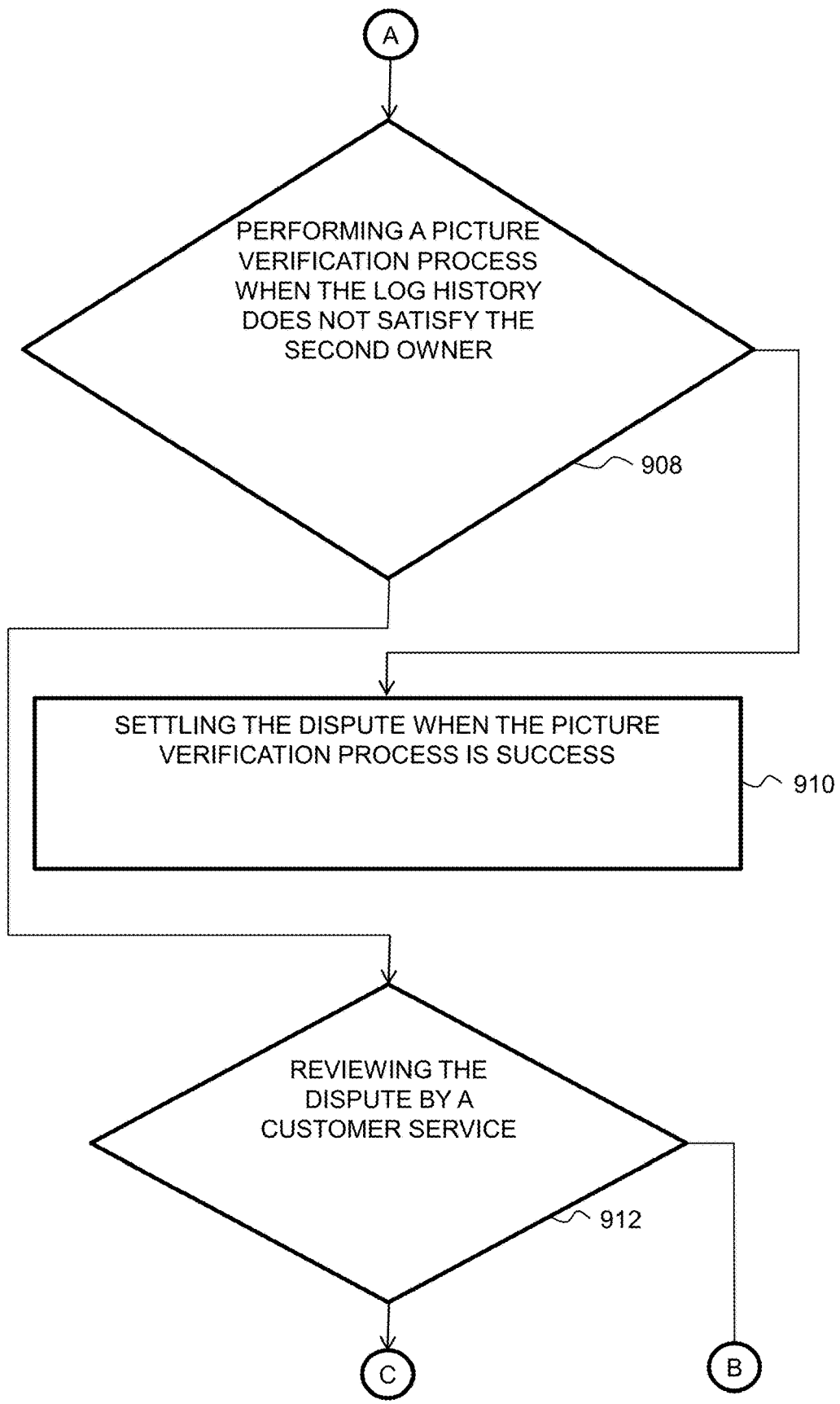
Figure 9C:
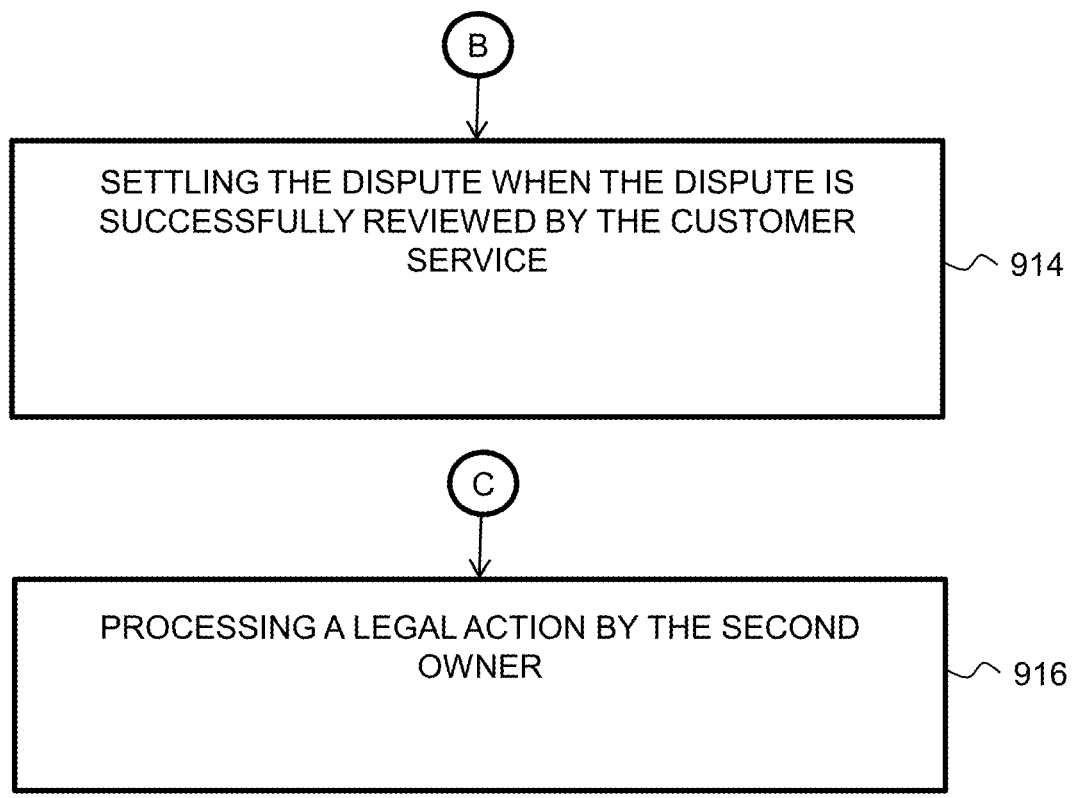

FIGS. 9A-9C are flow diagrams that illustrate a method of creating a dispute ticket to check a log history for log irregularities in accordance with an embodiment of the present disclosure. At step 902, a dispute ticket is created by a second owner. At step 904, the second owner is requested by a server to check the log history for irregularities. At step 906, a dispute is settled by the second owner when the second owner is satisfied with the log history. At step 908, a picture verification process is performed when the log history does not satisfy the second owner. At step 910, the dispute is settled when the picture verification process is success. At step 912, the dispute is reviewed by a customer service when the picture verification process is failed to settle the dispute. At step 914, the dispute is settled when the dispute is successfully reviewed by the customer service. At step 916, a legal action is processed by the second owner (e.g. court proceedings). In an embodiment, the legal action is processed by the first owner.

Figure 10A:
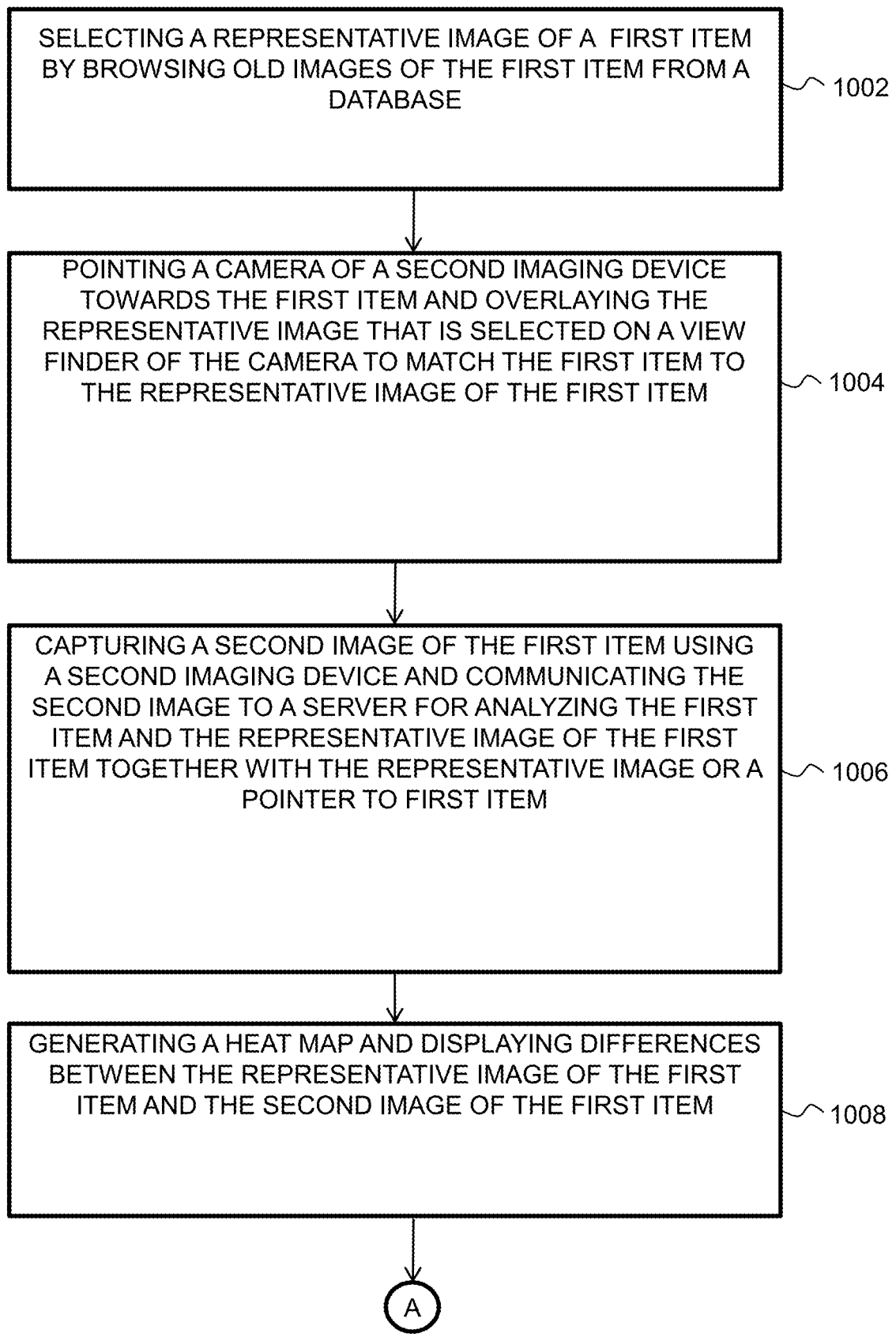
FIGS. 10A-10B are flow diagrams that illustrate a method of verifying correlation between a first interactive item card and a first item by creating a heat map in accordance with an embodiment of the present disclosure.
Figure 10B:
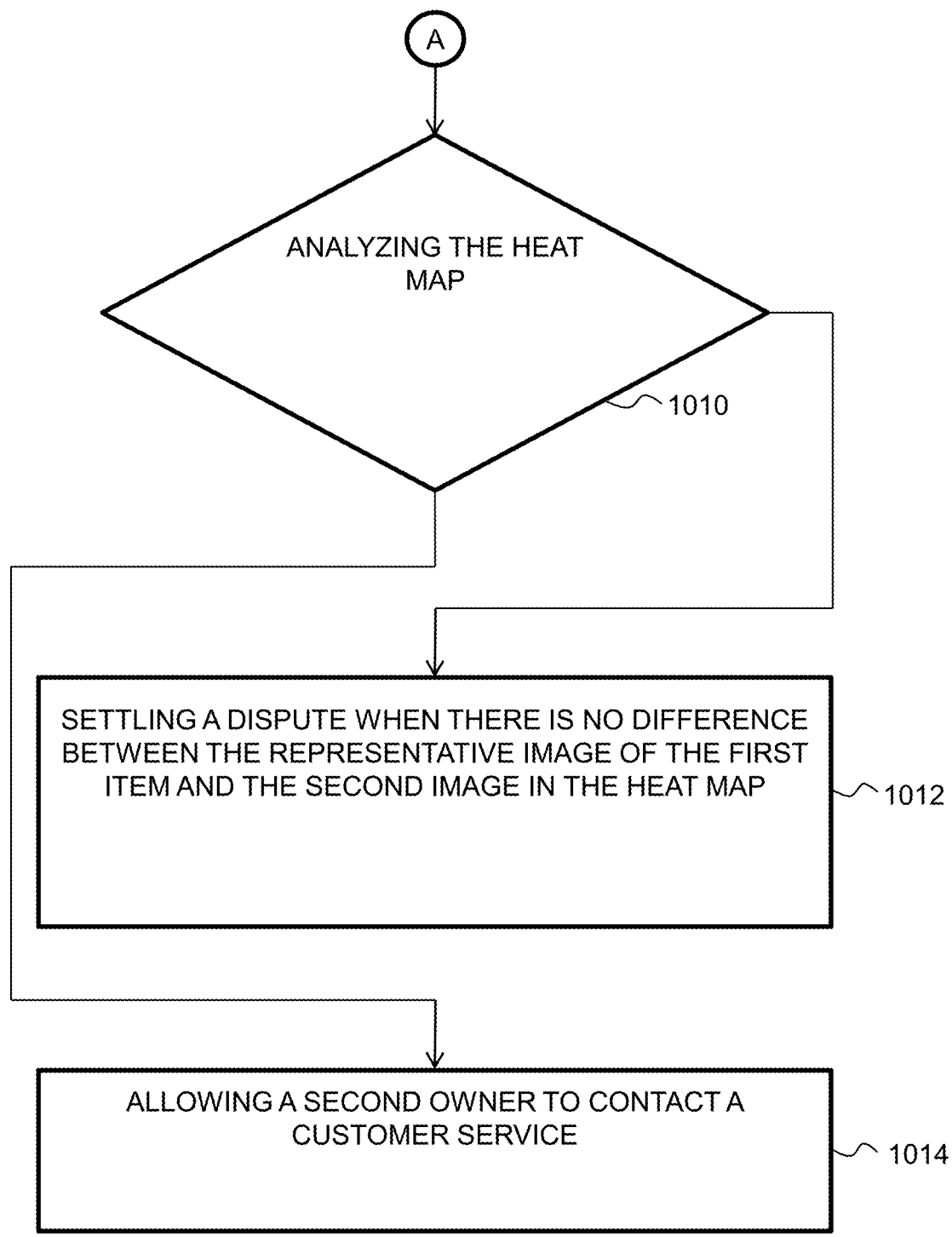

FIGS. 10A-10B are flow diagrams that illustrate a method of verifying correlation between a first interactive item card and a first item by creating a heat map in accordance with an embodiment of the present disclosure. At step 1002, a representative image of the first item is selected by a second owner by browsing old images of the first item from a database. At step 1004, a camera of a second imaging device is pointed towards the first item and overlaid the representative image that is selected on a view finder of the camera to match the first item to the representative image of the first item. At step 1006, a second image of the first item is captured using the second imaging device and the second image of the first item is communicated to a server for analyzing the first item and the representative image of the first item together with the representative image of the first item or a pointer to the representative image of the first item. At step 1008, a heat map is generated and the displayed differences between the representative image of the first item and the second image captured by the second imaging device. At step 1010, the heat map is analyzed by the second owner. In step 1012, a dispute is settled when there is no difference between the representative image and the second image in the heat map. In step 1014, a customer service may be contacted by the second owner.

Figure 11A:
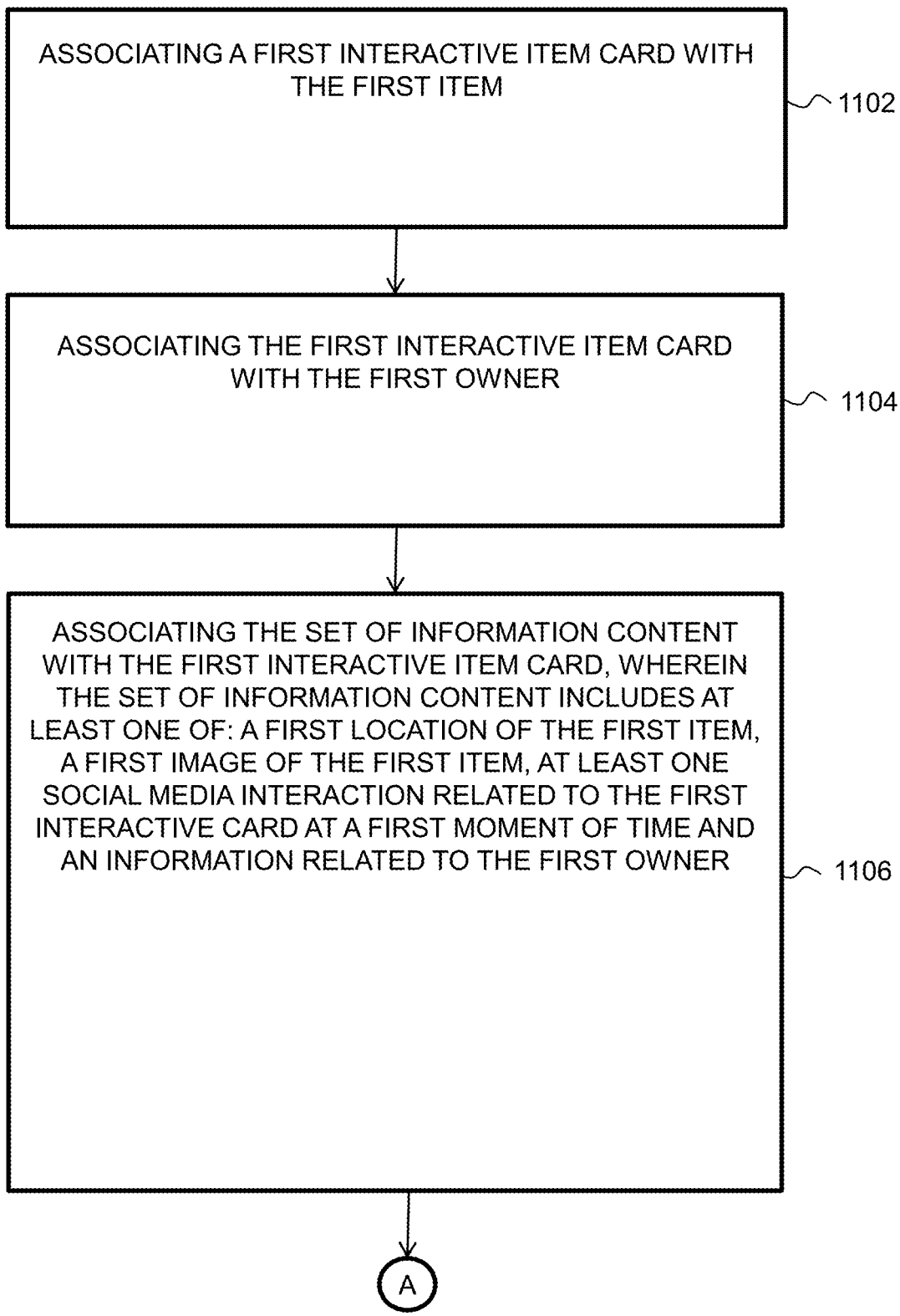
FIGS. 11A-11B are flow diagrams that illustrate a method of populating a database with a set of information related to a first item owned by a first owner in accordance with an embodiment of the present disclosure.
Figure 11B:
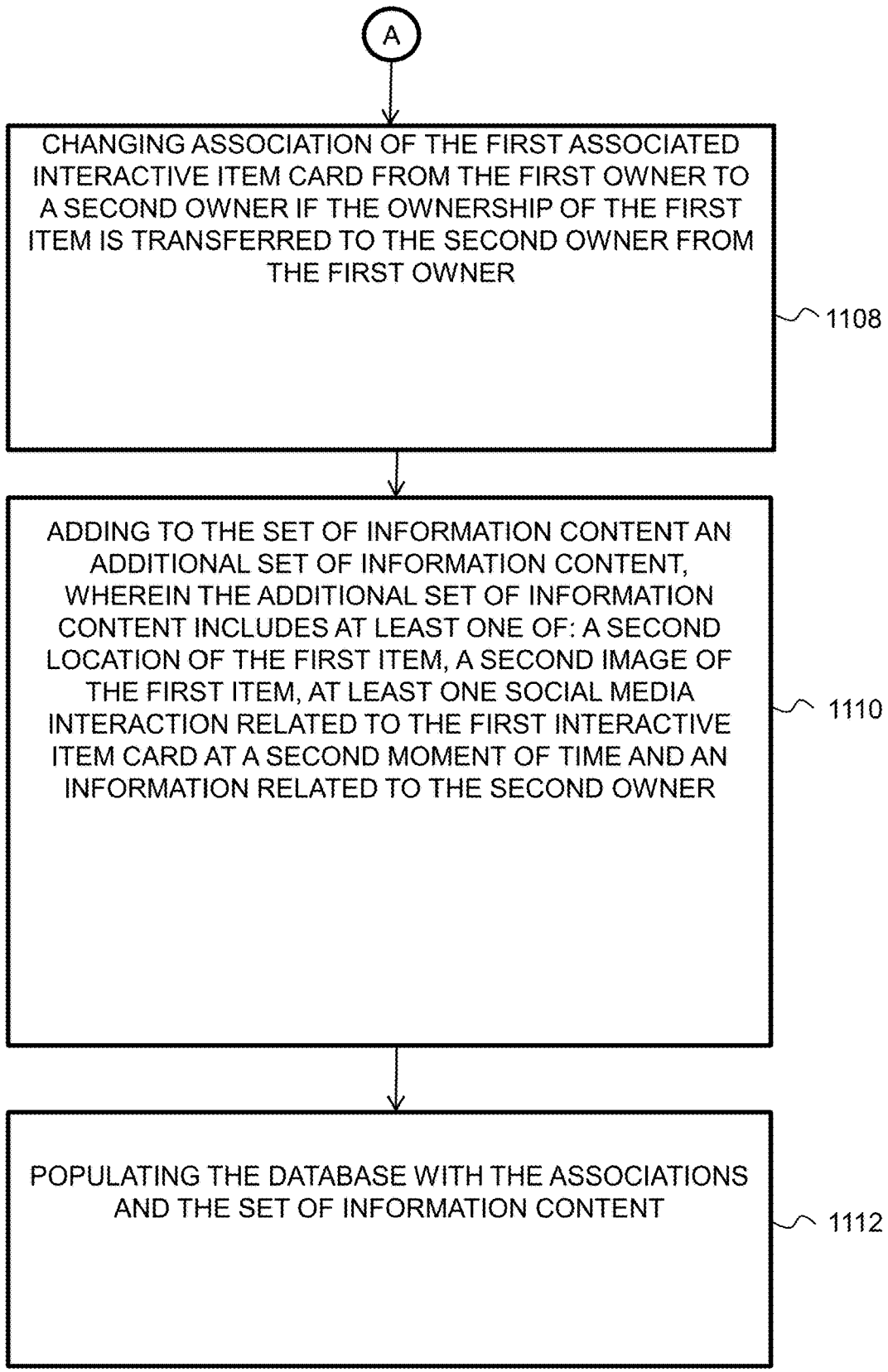

FIGS. 11A-11B are flow diagrams that illustrate a method of populating a database with a set of information related to a first item owned by a first owner in accordance with an embodiment of the present disclosure. At step 1102, a first interactive item card is associated with the first item. At step 1104, the first interactive item card is associated with the first owner. At step 1106, the set of information content is associated with the first interactive item card. The set of information content includes at least one of a first location of the first item, a first image of the first item, at least one social media interaction related to the first interactive item card at a first moment of time and an information related to the first owner. At step 1108, association of the first interactive item card is changed from the first owner to a second owner if the ownership of the first item is transferred to the second owner from the first owner. At step 1110, the set of information content is added to an additional set of information content. The additional set of information content includes at least one of a second location of the first item, a second image of the first item, at least one social media interaction related to the first interactive item card at a second moment of time and an information related to the second owner. At step 1112, the database is populated with the associations and the set of information content.

Figure 12:
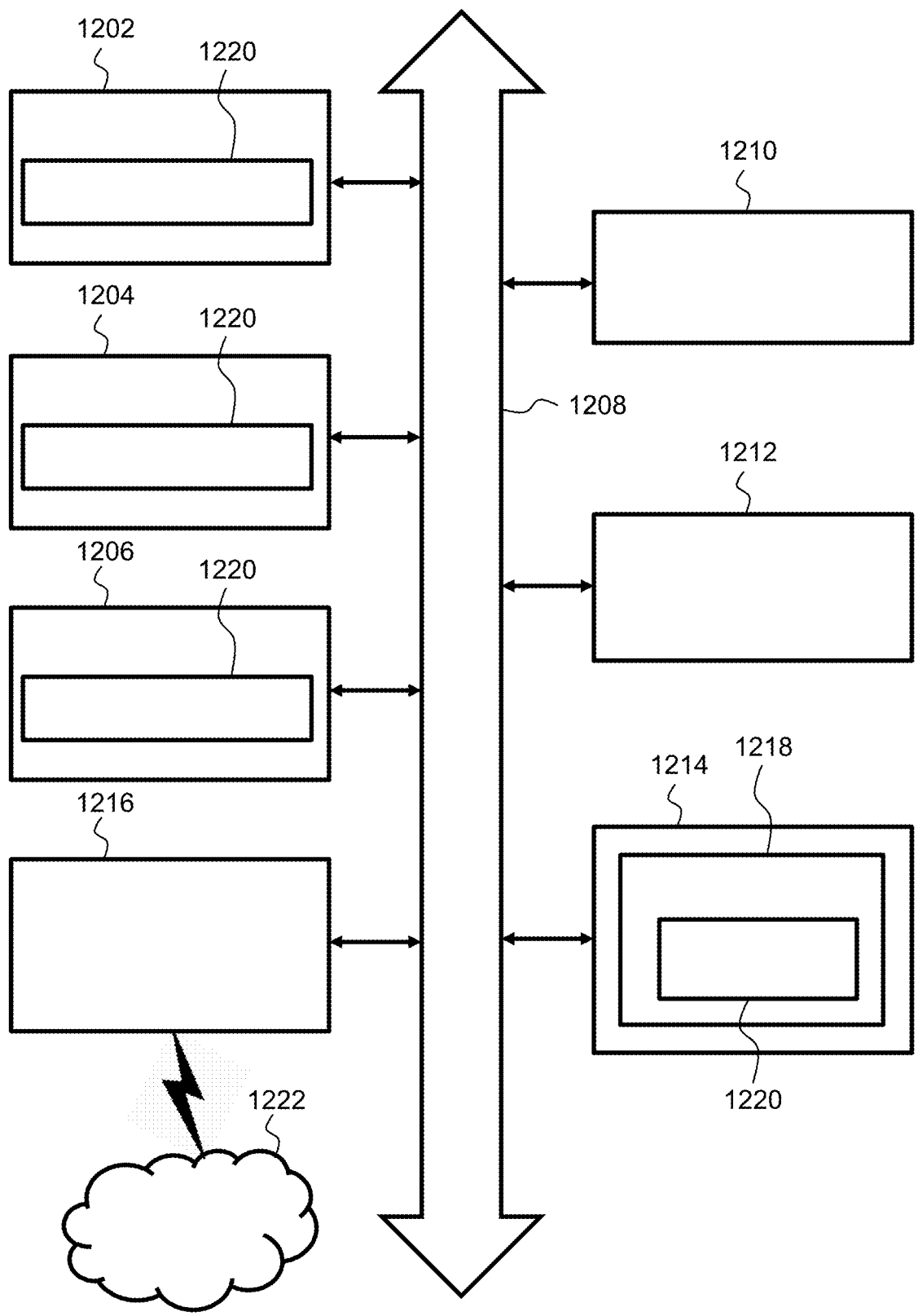
FIG. 12 shows a diagrammatic representation of a computer system within which a set of instructions for causing the machine to perform any one or more of the methodologies discussed herein may be executed in accordance with an embodiment of the present disclosure.

FIG. 12 shows a diagrammatic representation of a computer system within which a set of instructions for causing the machine to perform any one or more of the methodologies discussed herein may be executed in accordance with an embodiment of the present disclosure. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system includes a processor 1202 (e.g., a central processing unit (CPU) a graphics processing unit (GPU) or both), a main memory 1204 and a static memory 1206, which communicate with each other via a bus 1208. The computer system may further include a video display unit 1210 (e.g., a liquid crystal display (LCD), a light emitting diode (LED) or a cathode ray tube (CRT)). The computer system also includes an alphanumeric input device 1212 (e.g., a keyboard or touch screen), a disk drive unit 1214 and a network interface device 1216.

The disk drive unit 1214 includes a machine-readable medium 1218 on which is stored one or more sets of instructions 1220 (e.g., software) embodying any one or more of the methodologies or functions described herein. The instructions 1220 may also reside, completely or at least partially, within the main memory 1204 and/or within the processor 1202 during execution thereof by the computer system, the main memory 1204 and the processor 1202 also constituting machine-readable media. The instructions 1220 may further be transmitted or received over a network 1222 via the network interface device 1216.

While the machine-readable medium 1218 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method of populating a database with a set of information related to a sale transaction of a first item owned by a first owner and verifying an authenticity of the first item in the sale transaction, the method comprising:
    associating, with a processor of a computing device, a first interactive item card with the first item;
    associating, with the processor of the computing device, the first interactive item card with the first owner;
    capturing an image of the first item with a first camera;
    identifying a location of the first camera at the time of capturing of the image of the first item and associating the location of the first camera as a first location of the first item;
    associating, with the processor of the computing device, the set of information content with the first interactive item card, wherein the set of information content includes:
    the first location of the first item, the first image of the first item, at least one social media interaction related to the first interactive item card at a first moment of time and an information related to the first owner;
    presenting the set of information associated with the first item on a display of a computing device of at least one second user, wherein the computing device of the at least one second user is configured to enable the at least one second user to request a transfer of ownership of the first item in the sale transaction;
    responsive to the request for a transfer of ownership of the first item, changing, with the processor of the computing device, the association of the first associated interactive item card from the first owner to a second owner, wherein an authenticity of the first item is verified by:
    capturing a second image of the first item with a second camera;
    identifying a second location of the second camera at the time of the capturing of the second image;
    associating the location of the second cameras a second location of the first item;
    comparing, with the process of the computing device, the first image of the first item with the second image of the first item;
    determining, with the processor of the computing device, whether the first item in the second image is the same as the first item in the first image based on the comparing;
    transmitting from the computing device a result of the determination to the second owner, wherein the sale transaction is approved or disapproved by the second owner based on the result; and, if the sale transaction is approved:
    confirming, with the processor of the computing device, a transfer of physical ownership of the first item from the first owner to the second owner;
    adding, with the processor of the computing device, to the set of information content an additional set of information content, wherein the additional set of information content includes:
    the second location of the first item,
    the second image of the first item,
    at least one social media interaction related to the first interactive item card at a second moment of time; and an information related to the second owner;

populating, with the processor of the computing device, the database with the associations and the set of information content; and presenting on a display of a user interface of a device of the second owner an image of the first item and an updated first interactive item card.

2. The method according to claim 1, wherein the method further comprises;

capturing the first image of the first item with a first imaging device having a first location sensor for locating the first imaging device; and using the location of the first imaging device at the time of capturing the first image as the first location of the first item.

3. The method according to claim 1, wherein the method further comprises;

capturing the second image of the first item with a second imaging device having the second location sensor for locating the second imaging device; and using the location of the second imaging device at the time of capturing the second image as the second location of the first item.

4. The method according to claim 1, wherein the method further comprises verifying the association of the first interactive item card with the first item by analyzing differences between the first image of the first time with the second image of the first time and determining based on the differences if the first image of the first item and the second image have been taken from the first item or not.

5. The method according to claim 1, wherein the information content also comprises ownership history related to the first item and personal data related to the owners.

6. The method according to claim 1, wherein the method further comprises receiving the at least one social media interaction indication from a social media service, wherein the at least one social media interaction is done by a first user.

7. The method according to claim 1, wherein the method further includes recording an indication of information content change in a block chain.

8. The method according to claim 7, wherein the method further includes determining a fingerprint of the information content and using the determined fingerprint as the indication of information content change.

9. The method according to claim 8, wherein the fingerprint is determined by calculating a hash code of the information content.

10. A system comprising:

a database for maintaining and updating a set of information content;

a first camera for capturing a first image of a first item, the system being configured to identify a location of the first camera at the time of capturing of the image of the first item and associate the location of the first camera as a first location of the first item;

a second camera configured to capture a second image of the first item, the system being configured to capture a second image of the first item with a second camera, identify a second location of the second camera at the time of the capturing of the second image and associate the location of the second camera as a second location of the first item;

at least one module for analyzing differences between at least two images;

at least one social media service; and at least one device for rendering the set of information content related to a first interactive item card on a user interface of the at least one device and for users to interact with the first interactive item card via the at least one social media service to effectuate a sale transaction of the first item, wherein the system comprises a processor configured to verify an authenticity of the first item in the sale transaction by:

comparing the first image of the first item captured by the first camera in the first location with the second image of the first item captured by the second camera in the second location;

determining whether the first item in the second image at the second location is the same as the first item in the first image at the first location;

transmitting a result of the determination to the second owner, wherein the transaction is approved or disapproved by the second owner based on the result; and presenting on a display of a user interface of a device of the second owner an image of the first item and an updated first interactive item card.

* * * * *